(12) United States Patent
Yan

(10) Patent No.: US 10,197,896 B2
(45) Date of Patent: Feb. 5, 2019

(54) LASER LIGHT SOURCE WITH REDUCED BEAM COMBINATION OPERATION FOR PROJECTION DISPLAY

(71) Applicants: HISENSE CO., LTD., Qingdao, Shandong (CN); HISENSE USA CORPORATION, Suwanee, GA (US)

(72) Inventor: Guofeng Yan, Shandong (CN)

(73) Assignees: HISENSE CO., LTD., Qingdao, Shandong (CN); HISENSE USA CORPORATION, Suwanee, GA (US)

( * ) Notice: Subject to any disclaimer, the term of this patent is extended or adjusted under 35 U.S.C. 154(b) by 288 days.

(21) Appl. No.: 14/485,580

(22) Filed: Sep. 12, 2014

(65) Prior Publication Data

US 2015/0002823 A1     Jan. 1, 2015

Related U.S. Application Data

(63) Continuation of application No. PCT/CN2012/079891, filed on Aug. 9, 2012.

(30) Foreign Application Priority Data

Apr. 10, 2012    (CN) .......................... 2012 1 0103147

(51) Int. Cl.
    *G03B 21/20*      (2006.01)
    *G02B 26/00*      (2006.01)
    (Continued)

(52) U.S. Cl.
    CPC ......... *G03B 21/204* (2013.01); *G02B 26/008* (2013.01); *G02B 27/0905* (2013.01);
    (Continued)

(58) Field of Classification Search
    CPC ..................... G03B 21/204; G03B 21/2033
    See application file for complete search history.

(56) References Cited

U.S. PATENT DOCUMENTS

| | | | | |
|---|---|---|---|---|
| 8,337,027 B2* | 12/2012 | Ogura | .................. | G03B 21/204 353/31 |
| 8,342,697 B2* | 1/2013 | Iwanaga | .............. | G03B 21/204 348/743 |

(Continued)

FOREIGN PATENT DOCUMENTS

| | | |
|---|---|---|
| CN | 1637585 A | 7/2005 |
| CN | 101086608 A | 12/2007 |

(Continued)

OTHER PUBLICATIONS

State Intellectual Property Office of the P.R. China (ISR/CN), "International Search Report for PCT/CN2012/079891", China, dated Jan. 17, 2013.

(Continued)

*Primary Examiner* — Bao-Luan Le
(74) *Attorney, Agent, or Firm* — Tim Tingkang Xia, Esq.; Locke Lord LLP

(57) ABSTRACT

In one aspect, a light source for a projection display includes: three laser light sources, a beam combining lens, and a phosphor wheel coated with phosphor powders. Each of the first and second laser light sources outputs a first light beam and a second light beams respectively, which are respectively reflected by the beam combining lens. The third laser light source outputs a third light beam, which is projected onto the phosphor powders of the phosphor wheel. The phosphor wheel is excited by the third light beam to output a fourth light beam such that the fourth light beam is projected onto the beam combining lens. The beam combining lens reflects the first and second light beams, and transmits the fourth light beam therethrough.

20 Claims, 7 Drawing Sheets

(51) Int. Cl.
*G02B 27/09* (2006.01)
*G03B 33/08* (2006.01)
*G03B 21/14* (2006.01)
*G02B 1/10* (2015.01)

(52) U.S. Cl.
CPC ....... *G03B 21/142* (2013.01); *G03B 21/2033* (2013.01); *G03B 33/08* (2013.01); *G02B 1/10* (2013.01)

(56) References Cited

U.S. PATENT DOCUMENTS

| | | | | |
|---|---|---|---|---|
| 8,348,432 B2* | 1/2013 | Miyazaki | | G02B 26/008 353/31 |
| 8,496,333 B2* | 7/2013 | Wang | | G02B 26/0833 353/84 |
| 8,562,141 B2* | 10/2013 | Ogino | | G03B 21/2013 353/38 |
| 8,690,344 B2* | 4/2014 | Huang | | G03B 21/2013 353/20 |
| 8,721,087 B2* | 5/2014 | Kurosaki | | G03B 21/2013 353/30 |
| 8,814,366 B2* | 8/2014 | Sato | | G02B 19/0057 353/85 |
| 8,833,946 B2* | 9/2014 | Chen | | H04N 9/3161 353/84 |
| 8,915,597 B2* | 12/2014 | Kitano | | H04N 9/3105 353/94 |
| 8,955,985 B2* | 2/2015 | Matsubara | | G03B 21/2013 353/33 |
| 9,046,750 B2* | 6/2015 | Matsubara | | G03B 21/204 |
| 9,249,949 B2* | 2/2016 | Matsubara | | G03B 21/204 |
| 9,300,929 B2* | 3/2016 | Kashiwagi | | G02B 7/006 |
| 9,448,416 B2* | 9/2016 | Chifu | | G02B 27/48 |
| 2009/0284148 A1* | 11/2009 | Iwanaga | | G02B 26/008 313/506 |
| 2010/0328627 A1* | 12/2010 | Miyazaki | | G02B 26/008 353/85 |
| 2011/0051102 A1* | 3/2011 | Ogura | | G03B 21/204 353/85 |
| 2011/0063581 A1* | 3/2011 | Iwanaga | | G03B 21/204 353/31 |
| 2011/0109820 A1* | 5/2011 | Silverstein | | G02B 27/1053 349/8 |
| 2011/0242495 A1* | 10/2011 | Chen | | H04N 9/3161 353/31 |
| 2011/0261326 A1* | 10/2011 | Wang | | G02B 26/0833 353/31 |
| 2011/0292349 A1 | 12/2011 | Kitano et al. | | |
| 2011/0310353 A1* | 12/2011 | Maeda | | G03B 21/2033 353/31 |
| 2012/0133899 A1* | 5/2012 | Chiang | | H04N 9/3111 353/31 |
| 2012/0147332 A1* | 6/2012 | Huang | | G03B 21/2013 353/31 |
| 2012/0154767 A1* | 6/2012 | Kimura | | H04N 9/315 353/98 |
| 2012/0182712 A1* | 7/2012 | Huang | | G03B 21/2013 362/84 |
| 2012/0188516 A1* | 7/2012 | Kashiwagi | | G02B 7/006 353/31 |
| 2012/0229780 A1* | 9/2012 | Sato | | G02B 19/0057 353/85 |
| 2012/0249972 A1* | 10/2012 | Kurosaki | | G03B 21/2013 353/31 |
| 2012/0249974 A1* | 10/2012 | Ogino | | G03B 21/2013 353/38 |
| 2012/0268917 A1* | 10/2012 | Kitano | | H04N 9/3105 362/84 |
| 2013/0088689 A1* | 4/2013 | Lin | | G03B 21/204 353/31 |
| 2013/0194552 A1* | 8/2013 | Matsubara | | G03B 21/2013 353/31 |
| 2013/0215397 A1* | 8/2013 | Matsubara | | G03B 21/204 353/57 |
| 2013/0222772 A1* | 8/2013 | Matsubara | | G03B 21/204 353/31 |
| 2013/0242264 A1* | 9/2013 | Saitou | | G03B 21/2013 353/20 |
| 2013/0329448 A1* | 12/2013 | Franz | | G03B 21/204 362/555 |
| 2014/0028984 A1* | 1/2014 | Osaka | | G03B 21/2013 353/31 |
| 2014/0043589 A1* | 2/2014 | Chifu | | G03B 21/204 353/33 |
| 2014/0125956 A1* | 5/2014 | Chifu | | G02B 27/48 353/31 |

FOREIGN PATENT DOCUMENTS

| | | |
|---|---|---|
| CN | 101806990 A | 8/2010 |
| CN | 102141721 A | 8/2011 |
| CN | 102393598 A | 3/2012 |
| TW | 201033722 A | 9/2010 |

OTHER PUBLICATIONS

State Intellectual Property Office of People's Republic of China, "First Office Action and Search Report for CN Application No. 201210103147.4", China, dated May 6, 2014.
State Intellectual Property Office of People's Republic of China, "Second Office Action for CN Application No. 201210103147.4", China, dated Nov. 15, 2014.
State Intellectual Property Office of People's Republic of China, "First Office Action and Search Report for CN Application No. 201510237301.0", China, dated Feb. 1, 2016.
State Intellectual Property Office of People's Republic of China, "Second Office Action and Search Report for CN Application No. 201510237301.0", China, dated Aug. 8, 2016.

* cited by examiner

LASER LIGHT SOURCE WITH REDUCED BEAM COMBINATION OPERATION FOR PROJECTION DISPLAY

CROSS-REFERENCE TO RELATED APPLICATION

This application is a continuation application of international patent application No. PCT/CN2012/079891, filed Aug. 9, 2012, entitled "LIGHT SOURCE FOR PROJECTION DISPLAY," by Guofeng Yan, which itself claims the priority to Chinese Patent Application No. 201210103147.4, filed Apr. 10, 2012, entitled "LIGHT SOURCE FOR PROJECTION DISPLAY," by Guofeng Yan, which are hereby incorporated herein in their entireties by reference.

FIELD OF THE DISCLOSURE

The present disclosure relates to projection display technology, and more particularly to a light source for a projection display.

BACKGROUND

Currently, with the rapid development of projection display technology, there is a trend for the projection display products to have reduced size and enhanced brightness. A light source for the projection display is an essential component of the projection display product. Conventionally, the projection display product generally uses trichromatic light emitting diodes (LEDs) as its light source, where each of the trichromatic LEDs emits light independently. Since the independently emitted light beams are of the three primary colors having different wavelengths, the independently emitted light beams are performed with two respective beam combination operations so as to ultimately output desired white light. As a beam combining lens is required for each of the beam combination operations, it is generally necessary to provide at least two beam combining lenses in the conventional light source for projection display.

SUMMARY

One aspect of the present disclosure provides a light source for a projection display. In certain exemplary embodiments, the light source includes: a first laser light source; a second laser light source; a third laser light source; a beam combining lens; and a phosphor wheel coated with phosphor powders. The first laser light source is configured to output a first light beam such that the first light beam is reflected by the beam combining lens at an angle of 90 degrees. The second laser light source is configured to output a second light beam such that the second light beam is reflected by the beam combining lens at an angle of 90 degrees. The third laser light source is configured to output a third light beam such that the third light beam is projected onto the phosphor powders of the phosphor wheel. The phosphor wheel is configured to be excited by the third light beam to output a fourth light beam such that the fourth light beam is projected onto the beam combining lens. The beam combining lens is configured to reflect the first light beam and the second light beam, and to transmit the fourth light beam therethrough. When the first light beam and the second light beam are respectively reflected by the beam combining lens, the transmitted fourth light beam is combined with the reflected first light beam and the reflected second light beam to form a white light beam.

In certain exemplary embodiments, each of the first laser light source, the second laser light source, and the third laser light source is provided with a collimating lens, configured to collimate the corresponding light beam output by the corresponding laser light source.

In certain exemplary embodiments, the light source further includes at least one focusing lens provided between the beam combining lens and the phosphor wheel, where the third light beam is focused by the at least one focusing lens to be projected onto the phosphor wheel, and the fourth light beam output by the phosphor wheel by excitation passes through the at least one focusing lens to be projected onto the beam combining lens.

In certain exemplary embodiments, the beam combining lens has coating structures at a front side and a rear side thereof; and the coating structures are configured to reflect the first light beam, the second light beam and the third light beam, and to transmit the fourth light beam therethrough.

In certain exemplary embodiments, the third light beam output by the third laser light source is reflected by the beam combining lens onto the phosphor powders of the phosphor wheel at an angle of 90 degrees; and the beam combining lens is further configured to reflect the third light beam.

In certain exemplary embodiments, the light source further includes a first focusing lens group provided between the beam combining lens and the phosphor wheel, where the first focusing lens group comprises at least one focusing lens. In certain exemplary embodiments, the third light beam reflected by the beam combining lens passes through the at least one focusing lens of the first focusing lens group to be projected onto the phosphor powders of the phosphor wheel; and the fourth light beam output by the phosphor wheel by excitation passes through the at least one focusing lens of the first focusing lens group to be projected onto the beam combining lens.

In certain exemplary embodiments, the third light beam is a blue light beam, and the fourth light beam is a green light beam. In certain exemplary embodiments, the first light beam is a red light beam, and the second light beam is a blue light beam; or the first light beam is a blue light beam, and the second light beam is a red light beam.

In certain exemplary embodiments, the blue light beam may be a light beam of which the wavelength is in a range of about 430 nm to 460 nm, and the red light beam may be a light beam of which the wavelength is in a range of about 630 nm to 660 nm.

In certain exemplary embodiments, the third laser light source is a blue laser light source. In certain exemplary embodiments, the first laser light source is a red laser light source, and the second laser light source is a blue laser light source; or the first laser light source is a blue laser light source, and the second laser light source is a red laser light source.

In certain exemplary embodiments, the laser light source outputting the blue light beam may include at least one blue laser.

In certain exemplary embodiments, the blue laser may be a laser emitting light having a wavelength in a range of about 430 nm to 460 nm.

In certain exemplary embodiments, the blue laser further includes a beam diffusion component configured to make an etendue of the blue light beam being output to be equal to the etendue of the fourth light beam generated by the phosphor powders.

In one exemplary embodiment, the blue laser may be a semiconductor laser.

In certain exemplary embodiments, the output power of each blue laser may be about 1 watt (W), 1.4 W or 1.6 W.

In certain exemplary embodiments, the blue laser may include a first component for eliminating speckles.

In certain exemplary embodiments, when the laser light source outputting the blue light beam includes a plurality of blue lasers, the laser light source outputting the blue light beam may be a blue laser array formed of the plurality of blue lasers.

In certain exemplary embodiments, when the laser light source outputting the blue light beam is the first laser light source or the second laser light source, the blue laser array may include 8 blue lasers, which are arranged to form a 2×4 laser array.

In certain exemplary embodiments, when the laser light source outputting the blue light beam is the third laser light source, the blue laser array may include 24 blue lasers, which are arranged to form a 3×8 laser array.

In certain exemplary embodiments, the laser light source outputting the red light beam may include at least one red laser.

In certain exemplary embodiments, the red laser may be a laser emitting light having a wavelength in a range of about 630 nm to 660 nm.

In certain exemplary embodiments, the red laser may further include a beam diffusion component configured to make an etendue of the blue light beam being output to be equal to the etendue of the fourth light beam generated by the phosphor powders.

In certain exemplary embodiments, the red laser may be a semiconductor laser.

In certain exemplary embodiments, the output power of each red laser may be about 0.5 W.

In certain exemplary embodiments, the red laser may include a second component for eliminating speckles.

In certain exemplary embodiments, when the laser light source outputting the red light beam includes a plurality of red lasers, the laser light source outputting the red light beam may be a red laser array formed of the plurality of red lasers.

In certain exemplary embodiments, the red laser array includes 8 red lasers, which are arranged to form a 2×4 laser array.

In certain exemplary embodiments, when the third laser light source comprises a plurality of lasers, the third laser light source further includes an echelon lens; and the echelon lens includes a plurality of reflectors in an echelon arrangement, where each of the reflectors corresponds to one of the lasers, and is configured to reflect light beams output by the corresponding laser to the beam combining lens.

In certain exemplary embodiments, a substrate of the phosphor wheel is made of a transparent material, such that the third light beam output by the third laser light source is transmitted from a rear side of the phosphor wheel onto the phosphor powders of the phosphor wheel to excite the phosphor powders of the phosphor wheel to output the fourth light beam.

In certain exemplary embodiments, the light source for projection display may further include a first focusing lens group and a second focusing lens group. The first focusing lens group is provided between the beam combining lens and the phosphor wheel, and the first focusing lens group includes at least one focusing lens. The second focusing lens group is provided between the third laser light source and the phosphor wheel, and the second focusing lens group includes at least one focusing lens. The third light beam output by the third laser light source may pass through the focusing lens of the second focusing lens group to be transmitted from the rear side of the phosphor wheel onto the phosphor powders of the phosphor wheel. The fourth light beam output by the phosphor wheel by excitation may pass through the focusing lens of the first focusing lens group to be projected onto the beam combining lens.

In certain exemplary embodiments, the first laser light source and the second laser light source are packaged on a same substrate; the first laser light source comprises a plurality of first chips arranged on the substrate and capable of outputting the first light beam; and the second laser light source comprises a plurality of second chips arranged on the substrate and capable of outputting the second light beam.

In certain exemplary embodiments, the third laser light source is a laser light source emitting a light beam having a wavelength of about 400 nm to 410 nm.

In another aspect of the present disclosure, a light source for a projection display includes: a first laser light source; a third laser light source; a beam combining lens; and a phosphor wheel coated with phosphor powders. The first laser light source is configured to output a first light beam within a first period of time such that the first light beam is reflected by the beam combining lens at an angle of 90 degrees. The third laser light source is configured to output a third light beam such that the third light beam is projected onto the phosphor wheel. The phosphor wheel is configured to transmit the third light beam therethrough within a second period of time such that the transmitted third light beam is projected onto the beam combining lens, and to be excited by the third light beam within a third period of time to output a fourth light beam such that the fourth light beam is projected onto the beam combining lens. The beam combining lens is configured to reflect the first light beam, and to transmit the third light beam and the fourth light beam therethrough. When the first light beam is reflected by the beam combing lens, the transmitted third light beam and the transmitted fourth light beam are combined with the reflected first light beam to form a white light beam.

In certain exemplary embodiments, the first light beam is a red light beam, the third light beam is a blue light beam, and the fourth light beam is a green light beam.

In certain exemplary embodiments, a substrate of the phosphor wheel is made of a transparent material. In certain exemplary embodiments, a front side of the phosphor wheel includes: a first designated area, a second designated area, and a third designated area, where a shading material is coated on the first designated area of the front side of the phosphor wheel; the second designated area of the front side of the phosphor wheel is an uncoated area, and is in a transparent state; and phosphor powders are coated on the third designated area of the front side of the phosphor wheel. When the light source for projection display is in an operating state, the phosphor wheel rotates at a predetermined rotation speed.

In certain exemplary embodiments, the phosphor wheel is further configured to output the fourth light beam by excitation according to the received third light beam in the first period of time, such that the fourth light beam is projected onto the beam combining lens.

In certain exemplary embodiments, a substrate of the phosphor wheel is made of a transparent material. In certain exemplary embodiments, a front side of the phosphor wheel includes: a first designated area, a second designated area, and a third designated area, where phosphor powders are coated on the first designated area and the third designated area of the front side of the phosphor wheel, and the second designated area of the front side of the phosphor wheel is an uncoated area, and is in a transparent state. When the light source for projection display is in an operating state, the phosphor wheel rotates at a predetermined rotation speed.

As described above, in certain exemplary embodiments of the present disclosure, a light source for a projection display may include: a first laser light source; a second laser light source; a third laser light source; a beam combining lens; and a phosphor wheel coated with phosphor powders. By using the light source for the projection display, beam combination operation may be performed only once to the light beams output by laser light sources of two primary colors and the light beam output by the excited phosphor powders, thus obtaining a white light beam as the desired output, thereby decreasing the overall volume of the light source, and reducing the manufacturing cost of the light source.

These and other aspects of the disclosure will become apparent from the following description of several exemplary embodiments taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more exemplary embodiments of the disclosure and together with the written description, serve to explain the principles of the disclosure. Wherever possible, the same reference numbers are used throughout the drawings to refer to the same or like elements of an exemplary embodiment.

DETAILED DESCRIPTION OF THE DISCLOSURE

Figure 1:
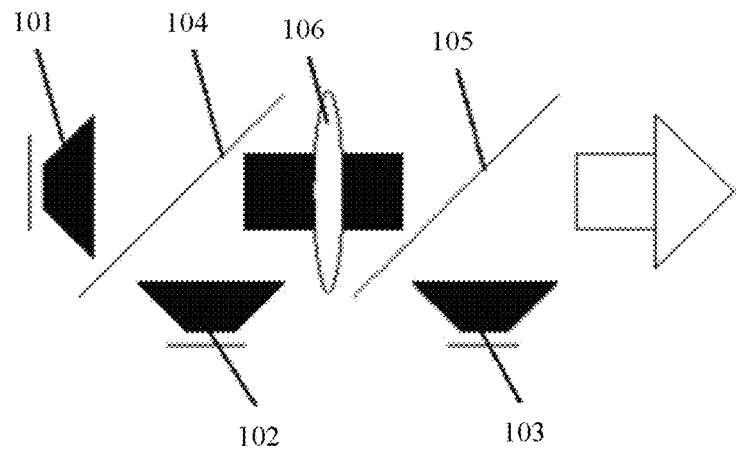
FIG. 1 schematically shows the structure of a light source for a projection display according to one exemplary embodiment of the present disclosure.

The disclosure will now be described hereinafter with reference to the accompanying drawings, in which several exemplary embodiments of the disclosure are shown. This disclosure may, however, be embodied in many different forms and should not be construed as limited to the exemplary embodiments set forth herein.

The terms used in this specification generally have their ordinary meanings in the art, within the context of the disclosure, and in the context where each term is used. Certain terms that are configured to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various exemplary embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

As used herein, the term "unit", or "module" may refer to, be part of, or include software and/or hardware components, such as an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term unit or module may also include memory (shared, dedicated, or group) that stores code executed by the processor.

The description will be made as to the exemplary embodiments of the disclosure in conjunction with the accompanying drawings in FIGS. 1-15. It should be understood that exemplary embodiments described herein are merely used for explaining the disclosure, but are not intended to limit the disclosure. In accordance with the purposes of this disclosure, as embodied and broadly described herein, this disclosure, in certain aspects, relates to a light source for a projection display, so as to effectively reduce the overall volume of the light source and the manufacturing cost thereof.

FIG. 1 is a schematic structural view of a light source for a projection display. As shown in FIG. 1, the light source for projection display generally at least includes: a red light source 101, a blue light source 102, a green light source 103, a first beam combining lens 104, a second beam combining lens 105, and at least one field lens 106. The first beam combining lens 104 performs beam combination on the red light output by the red light source 101 and the blue light output by the blue light source 102. A light beam after the beam combination passes through the field lens 106, and the second beam combining lens 105 then performs another beam combination on the light beam and green light output by the green light source 103 to output a desired white light beam.

Generally, the spatial volume occupied by the light source for the projection display is mainly decided by the etendue of the light source and a degree of complexity of a beam combination structure. The etendue of the light source is a property of light in an optical system, which is the product (or spatial integration) of a light emitting area of a light beam emitted by the light source and a solid angle (i.e., an angle of divergence) of the light beam. A light beam output by a LED generally has a relatively large light emitting area, where an average light emitting area per watt is generally above 1 mm$^2$, and a solid angle of the output light beam is generally larger than 60 degrees. As an angle of divergence of a light beam output by the trichromatic LED is relatively large, the light beam output by the trichromatic LED generally be first collimated so as to reduce the angle of divergence of the light beam. However, according to the principle of invariance of the etendue, as the etendue remains unchanged, if an angle of divergence of a light beam is reduced, the radius of the light beam (i.e., the light emitting area of the light beam) may be increased. Therefore, in order to perform beam combination on light beams output by two of the trichromatic LEDs, beam combining lenses with relatively large diameters are required, and an interval between the beam combining lenses is increased correspondingly.

As a beam combining lens is required for each time of beam combination, it is necessary to generally configure at least two beam combining lenses in the trichromatic LED light source for the projection display. Moreover, although angles of divergence of the light beams output by the LEDs are decreased after collimation, the need of performing beam combination operation twice results in that the entire optical path is long. Thus, it is further necessary to arrange a corresponding field lens between the two beam combining lenses to maintain a light spot characteristic of the light beams, so as to avoid having the light spots that are too large to be used.

As described above, the quality of the light beams output by the trichromatic LEDs is undesirable, and the etendue is large. Therefore, a relatively complicated beam combination structure is often required to combine the light beams into white light, thereby resulting in difficulties to further decrease the overall volume of the projection display product without changing brightness, such that the entire occupational space of the projection display product is relatively large, and accordingly a cost problem also occurs.

Laser is known for its characteristics of having a small etendue. Further, technology involving red and blue lasers has become mature. For example, for a typical laser, a light emitting area per watt may be only less than 0.2 mm$^2$, and a half-angle of divergence of a laser light beam may be only about 20 degrees. Therefore, the etendue of laser is less than that of LEDs. In certain exemplary embodiments of the present disclosure, laser is used as a light source for the projection display. Further, due to the small etendue of the laser, in certain exemplary embodiments of the present disclosure, the laser light may be focused to a tiny light spot to excite phosphor powders to emit light, such that a light beam output by the phosphor powders being excited by the laser light also has a small etendue. Therefore, in certain exemplary embodiments of the present disclosure, beam combination operation may be performed only once to the light beams output by laser light sources of two primary colors and the light beam output by the excited phosphor powders, thus obtaining a white light beam as the desired output.

Figure 2:
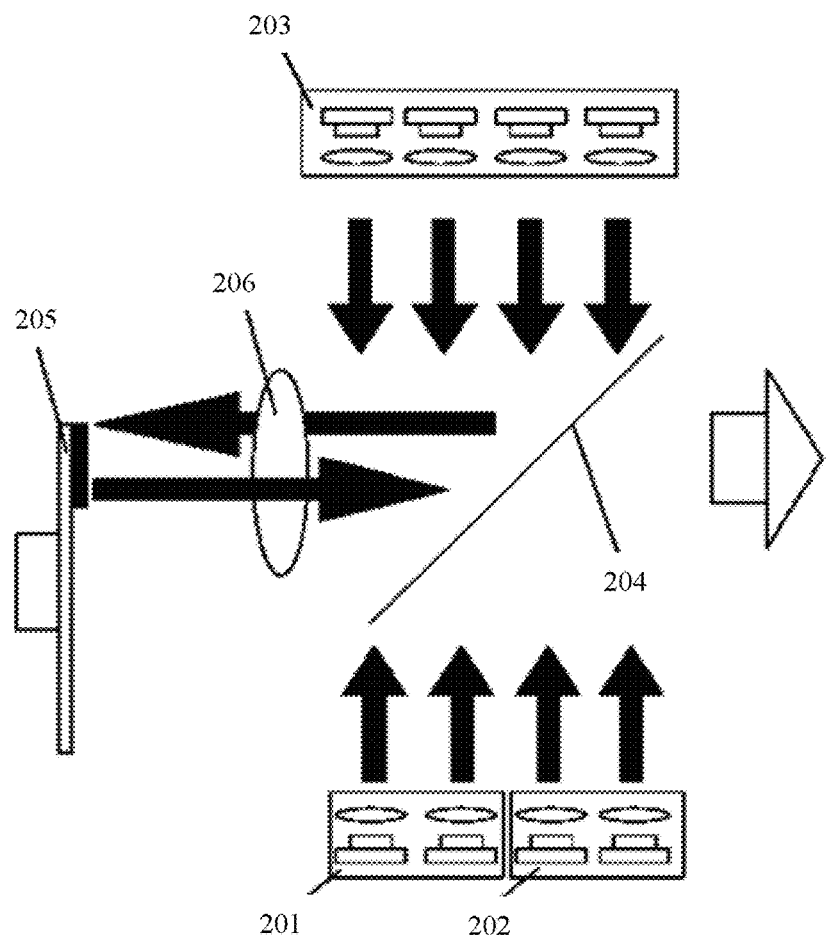
FIG. 2 schematically shows the structure of a light source for a projection display according to one exemplary embodiment of the present disclosure.

FIG. 2 schematically shows the structural of a light source for a projection display according to one exemplary embodiment of the present disclosure. As shown in FIG. 2, in one exemplary embodiment of the present disclosure, the light source for projection display at least includes: a first laser light source 201, a second laser light source 202, a third laser light source 203, a beam combining lens 204, and a phosphor wheel 205 coated with phosphor powders.

The first laser light source 201 is configured to output a first light beam such that the first light beam is reflected by the beam combining lens 204 at an angle of 90 degrees.

The second laser light source 202 is configured to output a second light beam such that the second light beam is reflected by the beam combining lens 204 at an angle of 90 degrees.

The third laser light source 203 is configured to output a third light beam such that the third light beam is reflected by the beam combining lens 204 and then projected onto the phosphor powders of the phosphor wheel 205.

The phosphor wheel 205 is configured to be excited by the received third light beam to output a fourth light beam such that the fourth light beam is projected onto the beam combining lens 204.

The beam combining lens 204 is configured to reflect the first light beam and the second light beam, and to further transmit the fourth light beam therethrough. When the first light beam and the second light beam are respectively reflected by the beam combining lens 204, the transmitted fourth light beam is combined with the reflected first light beam and the reflected second light beam by the beam combining lens 204 to form a white light beam.

In one exemplary embodiment of the present disclosure, the third light beam is a blue light beam, and the fourth light beam is a green light beam.

In certain exemplary embodiments of the present disclosure, the first light beam may be a red light beam, and the second light beam may be a blue light beam. Alternatively, the first light beam may be a blue light beam, and the second light beam may be a red light beam.

Therefore, the third laser light source 203 may be a blue laser light source. The first laser light source 201 may be a red laser light source, and the second laser light source 202 may be a blue laser light source. Alternatively, the first laser light source 201 may be a blue laser light source, and the second laser light source 202 may be a red laser light source.

As shown in FIG. 2, in one exemplary embodiment of the present disclosure, at least one focusing lens 206 is further provided between the beam combining lens 204 and the phosphor wheel 205, and the fourth light beam output by the phosphor wheel 205 by excitation passes through the at least one focusing lens 206 to be projected onto the beam combining lens 204. With the presence of the focusing lens 206, light spots projected onto the beam combining lens 204 can be reduced, so as to reduce the diameter of the beam combining lens 204. Further, when the third light beam is reflected by the beam combining lens 204 at an angle of 90 degrees, the reflected third light beam may be focused by the at least one focusing lens 206 to be projected onto the phosphor powders of the phosphor wheel 205. Thus, the phosphor wheel 205 is excited by the third light beam to output the fourth light beam.

Figure 3:
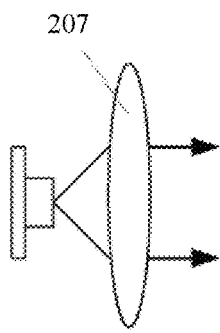
FIG. 3 schematically shows a collimating lens according to one exemplary embodiment of the present disclosure.

As shown in FIG. 3, in one exemplary embodiment of the present disclosure, each of the first laser light source 201, the second laser light source 202, and the third laser light source 203 is provided with a collimating lens 207. Each collimating lens 207 is configured to collimate the corresponding light beam output by the corresponding laser light source. It should be particularly noted that the configuration of the collimating lens 207 as shown in FIG. 3 represents one exemplary embodiment of the present disclosure, and alternative configurations of the collimating lens 207 may apply. In certain exemplary embodiments, for example, one or more of the first laser light source 201, the second laser light source 202, and the third laser light source 203 may be provided with a collimating lens 207.

Figure 4:
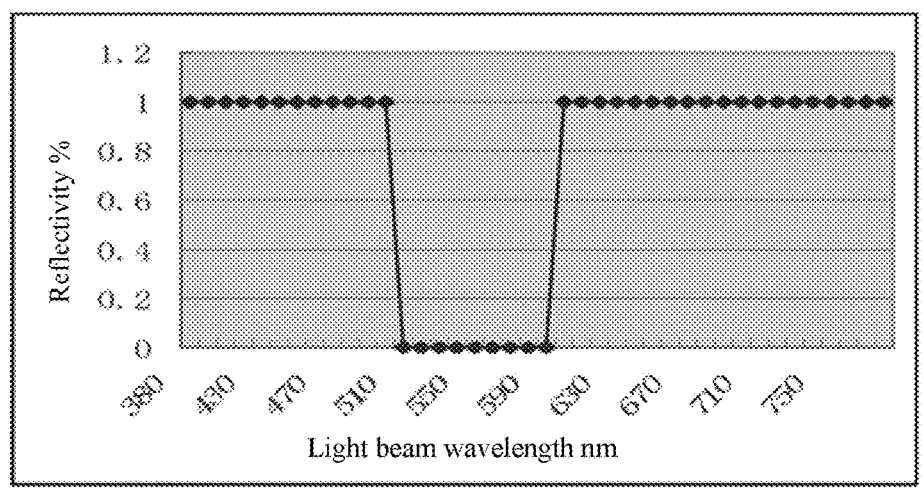
FIG. 4 schematically shows characteristics of a coating structure according to one exemplary embodiment of the present disclosure.

In one exemplary embodiment of the present disclosure, the beam combining lens 204 has coating structures at a front side and a rear side thereof. For example, the front side of the beam combining lens 204 may be coated with an anti-reflection film, and the rear side of the beam combining lens 204 may be coated with a high-reflection film. In certain exemplary embodiments of the present disclosure, the rear side of the beam combining lens 204 refers to a lens surface facing the first laser light source 201 and/or the second laser light source 202, and the front side of the beam combining lens 204 refers to a lens surface facing the third laser light source 203. The coating structures may be configured to reflect the first light beam and the second light beam, and to transmit the fourth light beam therethrough. Further, the coating structures may also be configured to reflect the third light beam, so that the third light beam, after being reflected by the beam combining lens 204 at an angle of 90 degrees, can be projected onto the phosphor powders of the phosphor wheel 205. For example, for one coating structure as shown in FIG. 4, the reflectivity of the coating structure for visible light beams whose wavelengths are less than 500 nm (for example, blue light beams) and visible light beams whose wavelengths are larger than 610 nm (for example, red light beams) is 100% or close to 100%, and the reflectivity for visible light beams whose wavelengths are between 500 nm and 610 nm (for example, green light beams) is 0 or close to 0. Therefore, the coating structure can reflect blue light beams and red light beams, and transmit green light beams therethrough.

Optionally, in certain exemplary embodiments of the present disclosure, phosphor powders that emit green light beams and yellow light beams may be coated in a range of all 360 degrees on the phosphor wheel 205. Alternatively, phosphor powders that emit green light beams may be coated in one range of 180 degrees on the phosphor wheel 205, and phosphor powders that emit yellow light beams may be coated in the other range of 180 degrees on the phosphor wheel 205. In certain exemplary embodiments, wavelengths of outgoing light beams of the phosphor wheel 205 are mainly between 500 nm and 620 nm.

As described above, in certain exemplary embodiments of the present disclosure, all light sources used in the light source for the projection display may be laser light sources. In comparison with a conventional LED light source, the etendue of a laser light source is reduced and is less than the etendue that is acceptable in a projection display system. Therefore, even if the first light beam and the second light beam respectively output by the first laser light source 201 and the second laser light source 202 are directly projected to a dodging device in the projection display system without performing beam combination, the etendue requirement may still be satisfied. The etendue requirement for core imaging elements such as a Digital Microlens surface Device (DMD) may be satisfied. Therefore, in the light source for projection display according to certain exemplary embodiments of the present disclosure, beam combination to the fourth light beam together with the first light beam and second light beam may be performed by one beam combining lens 204, so as to output the desired white light beam, thereby reducing the number of the beam combining lens 204 used in the light source for the projection display. Therefore, the overall volume of the light source for the projection display may be reduced, and the manufacturing cost of the light source for the projection display may also be reduced.

In addition, in certain exemplary embodiments of the present disclosure, as one beam combining lens 204 is used in the light source for the projection display, the optical path in the light source for the projection display is relatively short, and the number of field lenses require may be reduced. Further, the light beams output by the first laser light source 201 and the second laser light source 202, after being collimated by the corresponding collimating lens, may have smaller light emitting areas, and for each of the collimated light beams, the angle of divergence of may be of an order of milliradian. Therefore, the collimated light beams may be transmitted for a long distance without being diffused. Therefore, in certain exemplary embodiments of the present disclosure, it is possible not to use the field lenses in the light source for the projection display.

Certain exemplary embodiments of the present disclosure may be hereinafter introduced below to further describe the technical solutions.

Figure 5:
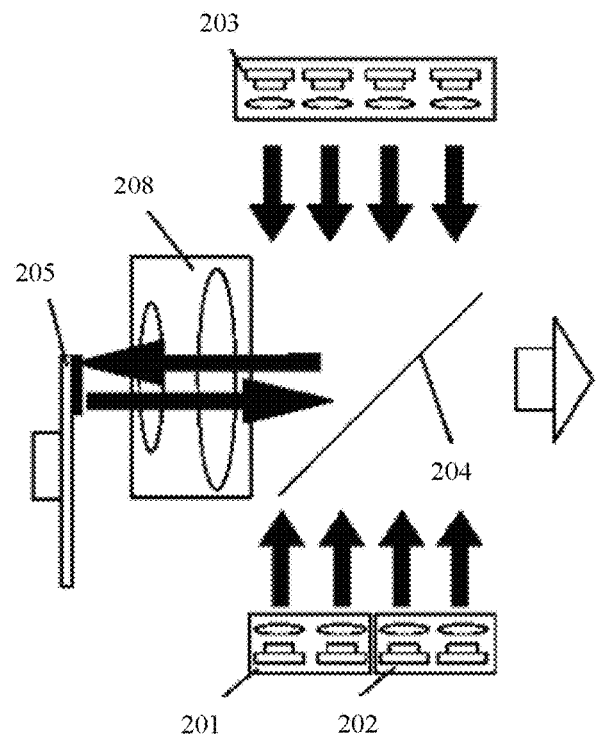
FIG. 5 schematically shows the structure of a light source for a projection display according to one exemplary embodiment of the present disclosure.
Figure 6:
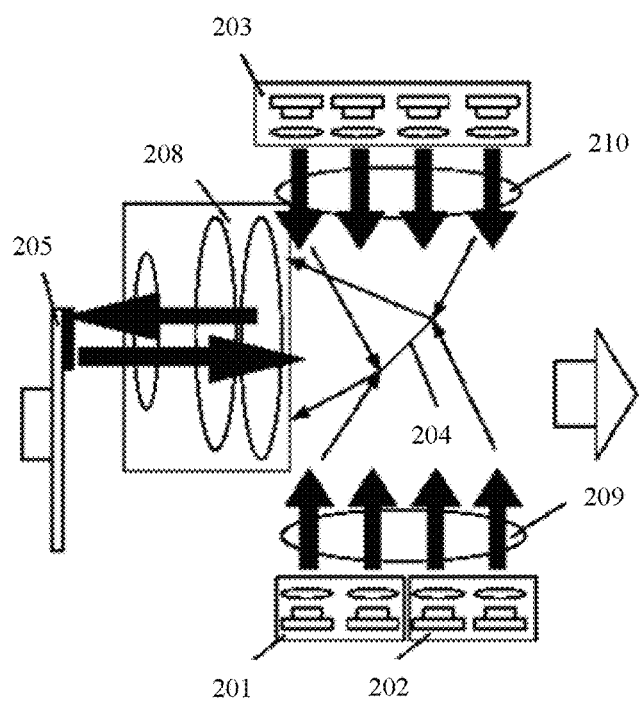
FIG. 6 schematically shows the structure of a light source for a projection display according to one exemplary embodiment of the present disclosure.

FIG. 5 schematically shows the structure of a light source for a projection display according to one exemplary embodiment of the present disclosure. FIG. 6 schematically shows the structure of a light source for a projection display according to one exemplary embodiment of the present disclosure.

As shown in FIG. 5 and FIG. 6, the light source for a projection display in the this exemplary embodiment at least includes: a first laser light source 201, a second laser light source 202, a third laser light source 203, a beam combining lens 204, and a phosphor wheel 205 coated with phosphor powders.

The first laser light source 201 is configured to output a first light beam such that the first light beam is reflected by the beam combining lens 204 at an angle of 90 degrees.

The second laser light source 202 is configured to output a second light beam such that the second light beam is reflected by the beam combining lens 204 at an angle of 90 degrees.

The third laser light source 203 is configured to output a third light beam such that the third light beam is reflected by the beam combining lens 204 at an angle of 90 degrees and then projected onto the phosphor powders of the phosphor wheel 205.

The phosphor wheel 205 is configured to be excited by the third light beam reflected by the beam combining lens 204 to output a fourth light beam such that the fourth light beam is projected onto the beam combining lens 204.

The beam combining lens 204 is configured to reflect the first light beam and the second light beam, to further reflect the third light beam, and to further transmit the fourth light beam therethrough. When the first light beam and the second light beam are respectively reflected by the beam combining lens 204, the transmitted fourth light beam is combined with the reflected first light beam and the reflected second light beam by the beam combining lens 204 to form a white light beam.

The third light beam may be a blue light beam, and the fourth light beam may be a green light beam.

In certain exemplary embodiments, the first light beam may be a red light beam, and the second light beam may be a blue light beam. Alternatively, the first light beam may be a blue light beam, and the second light beam may be a red light beam.

Therefore, in one exemplary embodiment of the present disclosure, the third laser light source 203 may be a blue laser light source. The first laser light source 201 may be a red laser light source, and the second laser light source 202 may be a blue laser light source. Alternatively, the first laser light source 201 may be a blue laser light source, and the second laser light source 202 may be a red laser light source.

In one exemplary embodiment of the present disclosure, the light source for the projection display may further include a first focusing lens group 208.

The first focusing lens group 208 may be provided between the beam combining lens 204 and the phosphor wheel 205. In certain exemplary embodiments, the first focusing lens group 208 includes at least one focusing lens, the third light beam passes through the focusing lens of the first focusing lens group 208 to be projected onto the phosphor powders of the phosphor wheel 205, and the fourth light beam output by the phosphor wheel 205 by excitation may pass through the focusing lens of the first focusing lens group 208 to be projected onto the beam combining lens 204.

For example, as shown in FIG. 5 and FIG. 6, in one exemplary embodiment of the present disclosure, the first laser light source 201 and the second laser light source 202 are provided below the third laser light source 203. The beam combining lens 204 is provided between the first laser light source 201, the second laser light source 202, and the third laser light source 203. Further, the beam combining lens 204 is positioned such that the orientation of the beam combining lens 204 forms an angle of 45 degrees in relation to the optical path of the first and second laser light sources and in relation to the optical path of the third laser light source 203.

In certain exemplary embodiments where the first laser light source 201 is a red laser light source and the second laser light source 202 is a blue laser light source as an example, a red light beam (i.e., a first light beam) output by the first laser light source 201 and a blue light beam (i.e., a second light beam) output by the second laser light source 202 may both be projected vertically upwards onto the beam combining lens 204, which is oriented at an angle of 45 degrees, and then be reflected by the beam combining lens 204 at an angle of 90 degrees to eject rightwards along a horizontal direction. As both the etendue of the red laser light source and the etendue of the blue laser light source are small, the first light beam and the second light beam can be directly output to the dodging device in the projection display system without performing beam combination to satisfy the etendue requirement.

A blue light beam (i.e., a third light beam) output by the third laser light source 203 may be projected vertically downwards onto the beam combining lens 204, which is oriented at an angle of 45 degrees, and then be reflected by the beam combining lens 204 at an angle of 90 degrees to eject leftwards along a horizontal direction. The reflected blue light beam then passes through the focusing lens of the first focusing lens group 208 to be projected onto the phosphor powders of the phosphor wheel 205, thereby converging onto a small light spot on the phosphor wheel 205.

The phosphor powders of the phosphor wheel 205, after being projected by the blue light beam, may be excited to output a green light beam (i.e., a fourth light beam), which passes through the focusing lens of the first focusing lens group 208 to be then projected onto the beam combining lens 204. As the beam combining lens 204 may transmit green light therethrough, the green light beam may pass through the beam combining lens 204 to eject rightwards along a horizontal direction.

As a sum of the etendue of the red light beam and the etendue of the blue light beam is still smaller than the etendue of the green light beam, beam combination may be performed on the green light beam together with the red light beam and the blue light beam, which are combined to form a white light beam.

In one exemplary embodiment of the present disclosure, the light source for the projection display may further include: a first light source focusing lens 209 provided in front of the first laser light source 201 and the second laser light source 202 and a second light source focusing lens 210 provided in front of the third laser light source 203.

In certain exemplary embodiments, the light beams output by the first laser light source 201 and the second laser light source 202 respectively pass through the first light source focusing lens 209 to be focused and then projected onto the beam combining lens 204. The light beam output by the third laser light source 203 passes through the second light source focusing lens 210 to be focused and then projected onto the beam combining lens 204.

By using the first light source focusing lens 209 and the second light source focusing lens 210 as described above, the sizes of the light spots formed by the light beams output by the laser light sources being projected onto the beam combining lens 204 may be reduced, such that the dimension of the beam combining lens 204 can be reduced.

In certain exemplary embodiments of the present disclosure, the etendue of the green light beam output by the phosphor powders by excitation is mainly affected by two factors. One factor is the size of the light spot of the exciting light beam (i.e., the reflected third light beam). The size of the light spot determines a light emitting area of the green light beam output by the phosphor powders by excitation. The other factor is a light emitting angle of the light beam. As the phosphor powders emit light towards all directions in space, and only a part of the light energy being emitted within a certain angle may be received according to actual needs, the certain angle decides the etendue of the green light beam output by the phosphor powders by excitation. Due to the difference of the process of excitation of the phosphor powders and the demand for the primary color energy, the etendue of the green light beam (i.e., the fourth light beam) output by the phosphor powders by excitation is generally greater in comparison with those of the first light beam and the second light beam. Therefore, the sum of the etendue of the first light beam and the etendue of the second light beam is about equal to the etendue of the green light beam output by the phosphor powders by excitation. Accordingly, beam combination may be completed using one beam combining lens, which reduces the number of the beam combining lens in the light source for the projection display and the number of the field lens in the light source for projection display.

Further, in comparison with the embodiment as shown in FIG. 2, in the light source for projection display as shown in FIGS. 5 and 6, multiple focusing lenses (i.e., the first focusing lens group 208) are further provided between the beam combining lens 204 and the phosphor wheel 205 for reducing the sizes of the light spots projected onto the beam combining lens, thereby reducing the diameter of the beam combining lens. Therefore, the overall volume of the light source for the projection display may be reduced in a horizontal direction, and the dimension of the beam combining lens can be significantly reduced in a direction perpendicular to the drawing. As a result, a compact highly-integrated projection display device may be designed.

In one exemplary embodiment of the present disclosure, the blue light beam may be a light beam of which the wavelength is in a range of about 430 nm to 460 nm, and the red light beam may be a light beam of which the wavelength is in a range of about 630 nm to 660 nm.

Further, the laser light source outputting the blue light beam may include at least one blue laser, and the blue laser may be a laser emitting light having a wavelength in a range of about 430 nm to 460 nm. In one exemplary embodiment, the blue laser may be a semiconductor laser. The output power of each blue laser may be about 1 watt (W), 1.4 W or 1.6 W. The blue laser may include a first component for eliminating speckles. Optionally, the blue laser may further include a beam diffusion component configured to make an etendue of the blue light beam being output to be equal to the etendue of the green light beam (i.e., the fourth light beam) generated by the phosphor powders.

In certain exemplary embodiments, when the laser light source outputting the blue light beam includes a plurality of blue lasers, the laser light source outputting the blue light beam may be a blue laser array formed of the plurality of blue lasers.

In certain exemplary embodiments, when the laser light source outputting the blue light beam is the first laser light source 201 or the second laser light source 202, the blue laser array may include 8 blue lasers, which are arranged to form a 2×4 laser array. When the laser light source outputting the blue light beam is the third laser light source 203, the blue laser array may include 24 blue lasers, which are arranged to form a 3×8 laser array. In another example, when the laser light source outputting the blue light beam is the third laser light source 203, the blue laser array may include 32 blue lasers, which are arranged to form a 4×8 laser array, or two vertical 4×4 laser arrays.

in certain exemplary embodiments, the laser light source outputting the red light beam may include at least one red laser, and the red laser may be a laser emitting light having a wavelength in a range of about 630 nm to 660 nm. In certain exemplary embodiments, the red laser may be a semiconductor laser. The output power of each red laser may be about 0.5 W. The red laser may include a second component for eliminating speckles. Optionally, the red laser may further include a beam diffusion component configured to make an etendue of the blue light beam being output to be equal to the etendue of the green light beam (i.e., the fourth light beam) generated by the phosphor powders.

In certain exemplary embodiments, when the laser light source outputting the red light beam includes a plurality of red lasers, the laser light source outputting the red light beam may be a red laser array formed of the plurality of red lasers.

In certain exemplary embodiments, the red laser array includes 8 red lasers, which are arranged to form a 2×4 laser array.

Figure 7:
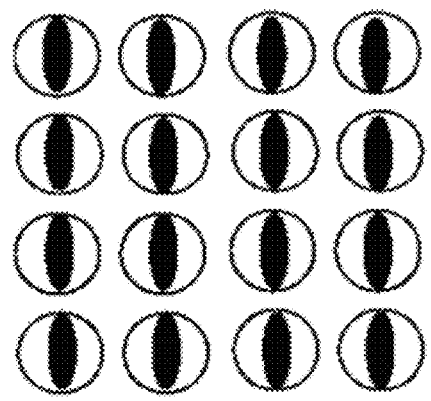
FIG. 7 schematically shows an array formed of a first laser light source and a second laser light source according to one exemplary embodiment of the present disclosure.

FIG. 7 schematically shows an array formed of a first laser light source and a second laser light source according to one exemplary embodiment of the present disclosure. In this embodiment, the first laser light source 201 and the second laser light source 202 are provided below the beam combining lens 204. Thus, the first laser light source 201 and the second laser light source 202 may form a laser array as shown in FIG. 7.

In certain exemplary embodiments, the emission angles of the blue semiconductor laser and the red semiconductor laser as shown in FIG. 7 are close to each other, and light emitting areas thereof are both about 0.1 mm². Therefore, the same collimating lens may be used for the blue semiconductor laser and the red semiconductor laser without inducing significant chromatic aberration influence. The collimating lens may be designed to have a relatively small phase difference within a laser emission angle. The light emitting areas of the semiconductor lasers are small, and the angles of divergence of the light beams after collimation are generally less than 1 degree. Therefore, light spots formed by the light beams are generally in oval shapes, having a maximum diameter of about 6 mm.

In the laser array as shown in FIG. 7, an interval between the adjacent lasers may be about 9 mm. When the diameter of the light spot of each laser after collimation is about 6 mm, the entire light spot formed by the laser array as shown in FIG. 7 may be a square-shaped light spot having a side length of about 33 mm.

In certain exemplary embodiments, the blue laser array of the third laser light source 203 may include 24 blue lasers, which are arranged to form a 3×8 laser array. When the diameter of the light spot of each laser after collimation is about 6 mm, the entire light spot formed by the blue laser array of the third laser light source 203 may be a light spot having a dimension of about 69 mm×24 mm.

In one exemplary embodiment of the present disclosure, the dimension of the beam combining lens 204 can be predetermined according to the sizes of light spots formed by the two laser arrays, such that the beam combining lens 204 may receive all light beams output by the two laser arrays.

In a case of implementation, light beam output with high brightness may be occasionally required. Generally, the brightness may be increased by ways of increasing the output intensity of green light beams. When the output intensity of the green light beams is increased, it is generally necessary to increase the number of lasers in the laser light source. However, when a great number of lasers is in the laser light source, the radius of the light spot formed by the laser light source generally may increase accordingly, thereby exceeding a desired light spot radius.

Figure 8:
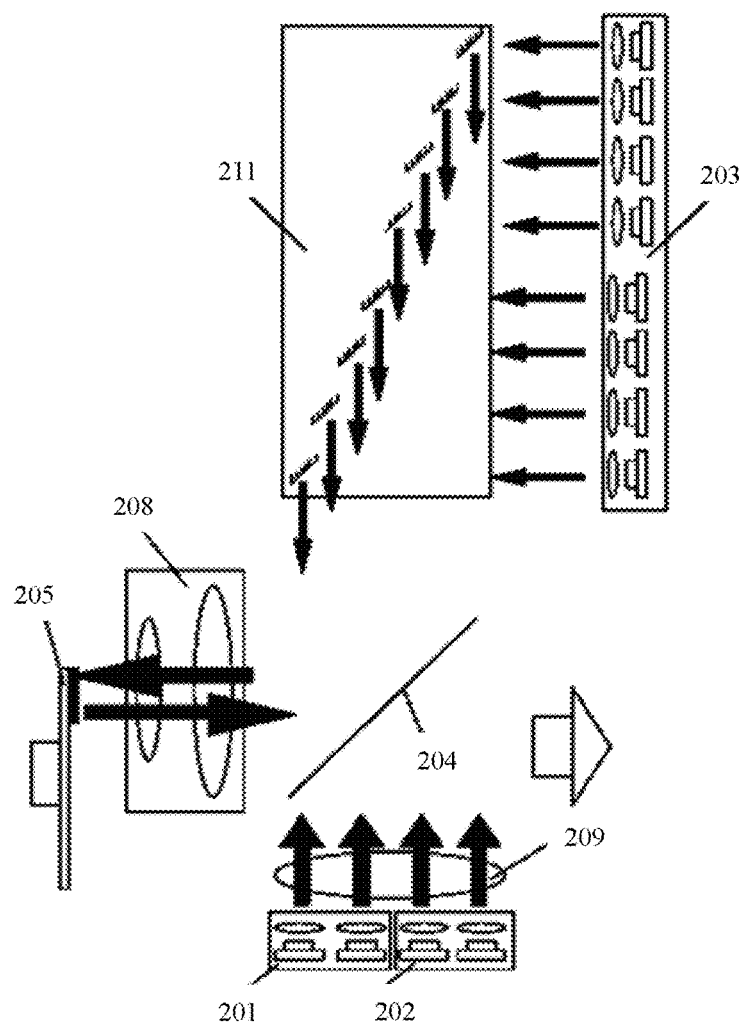
FIG. 8 schematically shows a light source for a projection display according to one exemplary embodiment of the present disclosure.
Figure 9:
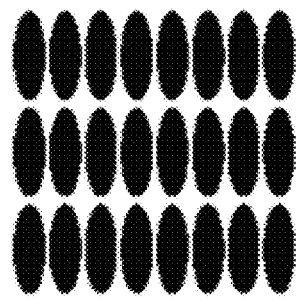
FIG. 9 schematically shows a light spot formed by a third laser light source according to one exemplary embodiment of the present disclosure.

FIG. 8 schematically shows a light source for a projection display according to one exemplary embodiment of the present disclosure. FIG. 9 schematically shows a light spot formed by a third laser light source according to one exemplary embodiment of the present disclosure.

The structure of the light source for the projection display in this embodiment as shown in FIGS. 8 and 9 is substantially similar to that of the light source for the projection display as shown in FIGS. 5 and 6, and descriptions of the similar parts and components are not repeated hereinafter. In comparison with the light source for the projection display as shown in FIGS. 5 and 6, the light source for the projection display in this embodiment has the following differences.

When the third laser light source 203 includes a plurality of lasers, the third laser light source 203 may further include an echelon lens 211.

The echelon lens 211 includes a plurality of reflectors, and each of the reflectors corresponds to one of the lasers in a one-by-one echelon arrangement. Each of the reflectors may be configured to reflect light beams output by the corresponding laser to the beam combining lens 204.

As shown in FIG. 9, an example that the third laser light source 203 includes 24 lasers, and the 24 lasers are arranged to form a 3×8 laser array is provided. 8 lasers are arranged along a short-side direction of the light spot formed by the third laser light source 203. In the third laser light source 203, light beams output by each lasers, after collimation, are projected onto the reflectors in the echelon arrangement, and then are reflected to be projected onto the beam combining lens 204. The reflectors are in an echelon arrangement, which is relatively dense. Therefore, the internal distances between light spots formed by respective light beams being reflected by the reflectors are reduced, and the overall arrangement of the light spots formed by the light beams is much tighter, such that the number of lasers in the third laser light source 203 may be increased under the premise that the size of the overall light spot formed by the third laser light source 203 does not change much, thereby improving the output brightness of the third laser light source 203 without increasing the dimension of the beam combining lens 204.

Accordingly, by using of the light source for the projection display as shown in FIG. 8, output brightness of the third laser light source 203 may be improved without the need to increase the dimension of the beam combining lens 204.

Figure 10:
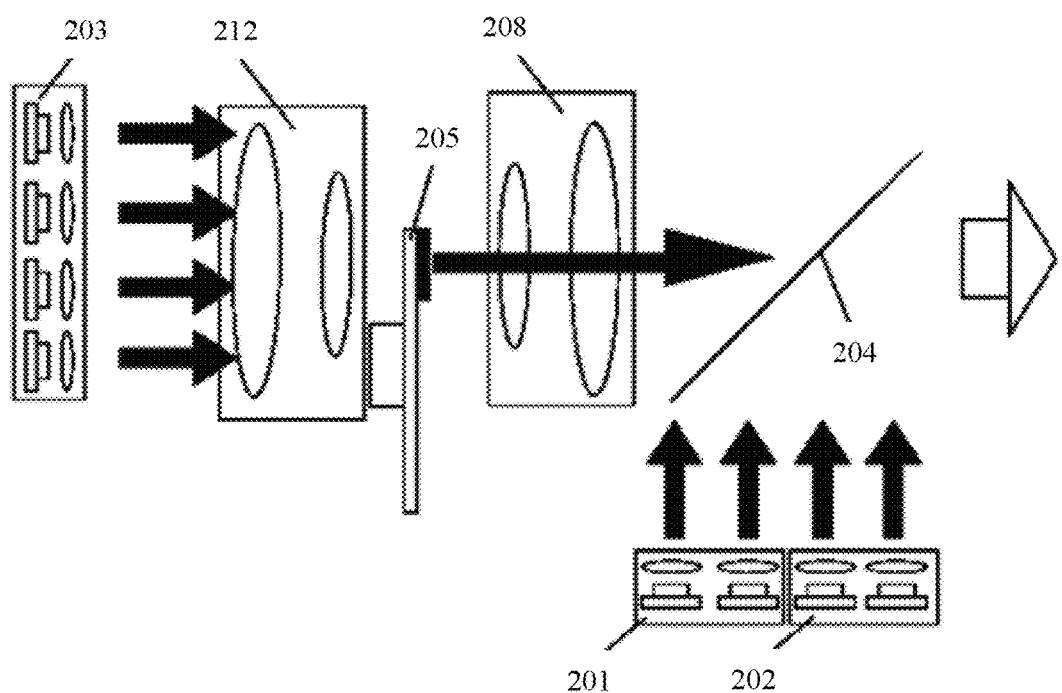
FIG. 10 schematically shows the structure of a light source for projection display according to one exemplary embodiment of the present disclosure.

FIG. 10 schematically shows the structure of a light source for projection display according to one exemplary embodiment of the present disclosure.

The structure of the light source for the projection display in this embodiment as shown in FIG. 10 is substantially similar to that of the light source for the projection display as shown in FIGS. 5 and 6, and descriptions of the identical parts and components are not repeated hereinafter. In comparison with the light source for the projection display as shown in FIGS. 5 and 6, the light source for the projection display in this embodiment has the following differences.

A substrate of the phosphor wheel 205 is made of a transparent material. Thus, instead of being reflected by the beam combining lens 204 and then projected onto the phosphor powders of the phosphor wheel 205, the third light beam output by the third laser light source 203 is transmitted from a rear side of the phosphor wheel 205 onto the phosphor powders of the phosphor wheel 205 to excite the phosphor powders of the phosphor wheel 205 to output the fourth light beam.

In one embodiment of the present disclosure, the light source for projection display may further include a first focusing lens group 208 and a second focusing lens group 212.

The first focusing lens group 208 is provided between the beam combining lens 204 and the phosphor wheel 205, and the first focusing lens group 208 includes at least one focusing lens.

The second focusing lens group 212 is provided between the third laser light source 203 and the phosphor wheel 205, and the second focusing lens group 212 includes at least one focusing lens.

The third light beam output by the third laser light source 203 may pass through the focusing lens of the second focusing lens group 212 to be transmitted from the rear side of the phosphor wheel 205 onto the phosphor powders of the phosphor wheel 205. The fourth light beam output by the phosphor wheel 205 by excitation may pass through the focusing lens of the first focusing lens group 208 to be projected onto the beam combining lens 204.

For example, as shown in FIG. 10, in one exemplary embodiment of the present disclosure, the first laser light source 201 and the second laser light source 202 are positioned below the beam combining lens 204, and the beam combining lens 204 is positioned to be oriented at an angle of 45 degrees in relation to a direction along which the first and second laser light sources output light beams.

In certain exemplary embodiments, an example that the first laser light source 201 is a red laser light source and the second laser light source 202 is a blue laser light source is hereinafter provided (the case where the first laser light source 201 is a blue laser light source and the second laser light source 202 is a red laser light source may be similar implemented with reference thereto). A red light beam (i.e., a first light beam) output by the first laser light source 201 and a blue light beam (i.e., a second light beam) output by the second laser light source 202 may both be projected vertically upwards onto the beam combining lens 204, which is oriented at an angle of 45 degrees, and are reflected by the beam combining lens 204 at an angle of 90 degrees to eject rightwards along a horizontal direction. In this case, the first light beam and the second light beam can be directly output to a dodging device of the projection display system without performing beam combination.

A blue light beam (i.e., a third light beam) output by the third laser light source 203 may be emitted rightwards along a horizontal direction to pass through the focusing lens of the second focusing lens group 212 to transmitted from the rear side of the phosphor wheel 205 therethrough to be projected onto the phosphor powders of the phosphor wheel 205, thereby converging to a small light spot on the phosphor wheel 205.

The phosphor powders of the phosphor wheel 205, after being projected by the blue light beam thereon, may be excited to output a green light beam (i.e., a fourth light beam), which passes through the focusing lens of the first focusing lens group 208 to be then projected onto the beam combining lens 204. As the beam combining lens 204 may transmit green light therethrough, the green light beam can pass through the beam combining lens 204 to eject rightwards along a horizontal direction.

In this case, beam combination may be performed on the green light beam together with the red light beam and blue light beam, which are combined to form a desired white light beam.

Figure 11:
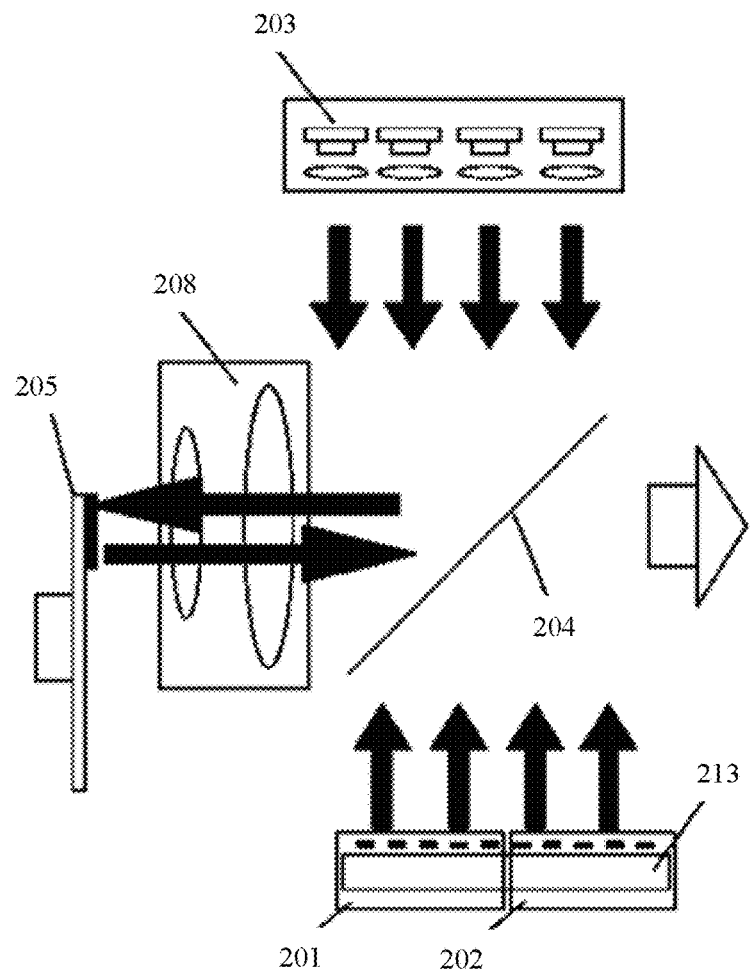
FIG. 11 schematically shows the structure of a light source for projection display according to one exemplary embodiment of the present disclosure.
Figure 12:
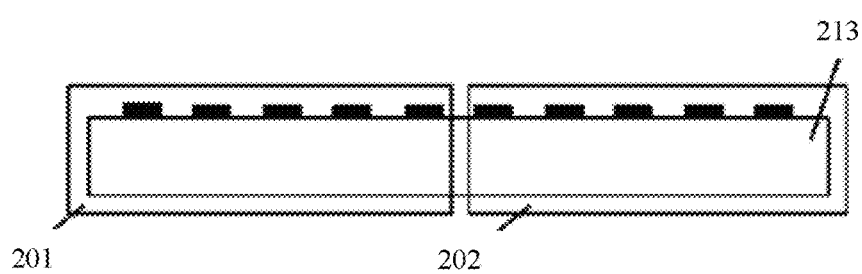
FIG. 12 schematically shows the structure of a substrate according to one exemplary embodiment of the present disclosure.

FIG. 11 schematically shows the structure of a light source for projection display according to one exemplary embodiment of the present disclosure. FIG. 12 schematically shows the structure of a substrate according to one exemplary embodiment of the present disclosure.

The structure of the light source for the projection display in this embodiment as shown in FIGS. 11 and 12 is substantially similar to that of the light source for the projection display as shown in FIGS. 5 and 6, and descriptions of the similar parts and components are not repeated hereinafter. In comparison with the light source for the projection display as shown in FIGS. 5 and 6, the light source for the projection display in this embodiment has the following differences.

The first laser light source 201 and the second laser light source 202 are packaged on a same substrate 213.

The first laser light source 201 includes a plurality of first chips arranged on the substrate 213 and capable of outputting the first light beam.

The second laser light source 202 includes a plurality of second chips arranged on the substrate 213 and capable of outputting the second light beam.

In certain exemplary embodiments, an example that the first light beam is a red light beam and the second light beam is a blue light beam is provided. In this case, the first chips are red chips that may output red light beams, and the second chips are blue chips that may output blue light beams. The case where the first light beam is a blue light beam and the second light beam is a red light beam may be similarly implemented with reference thereto and is thus not repeated herein.

In one exemplary embodiment of the present disclosure, the number and arrangement manner of the first chips and the second chips may be predetermined. The number of the chips may be predetermined according to desired power and color temperature of the white light. Therefore, the entire substrate 213 may be used as an optical component that may output light beams of two colors, and power supply for each chip can be controlled separately. Further, the light beams output by the first chips and the second chips can be directly projected onto the beam combining lens 204 after being collimated by a microlens array or a fast and slow axis collimation lens, and may also be projected onto the beam combining lens 204 after passing through a speckle eliminating component.

Figure 13:
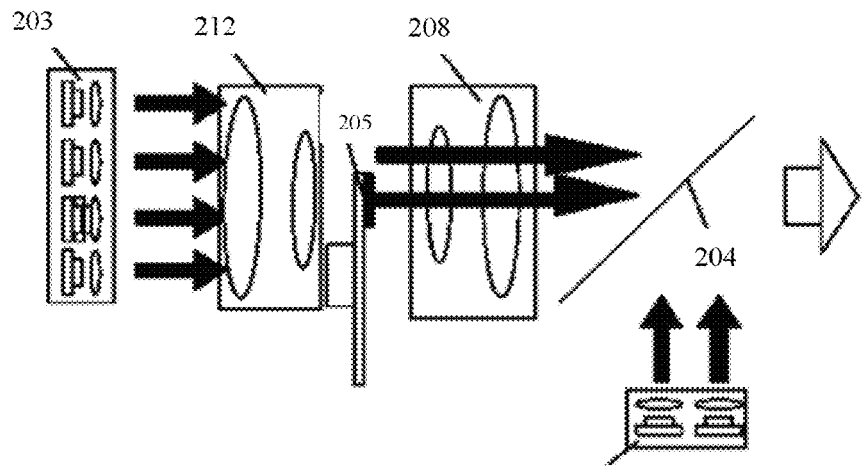
FIG. 13 schematically shows the structure of a light source for a projection display according to one exemplary embodiment of the present disclosure.
Figure 14:
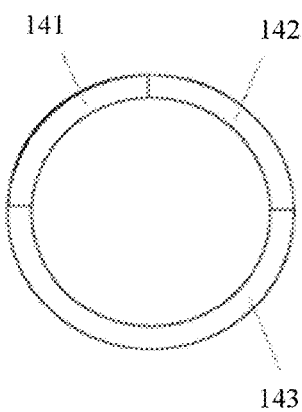
FIG. 14 schematically shows the structure of a phosphor wheel according to one exemplary embodiment of the present disclosure.
Figure 15:
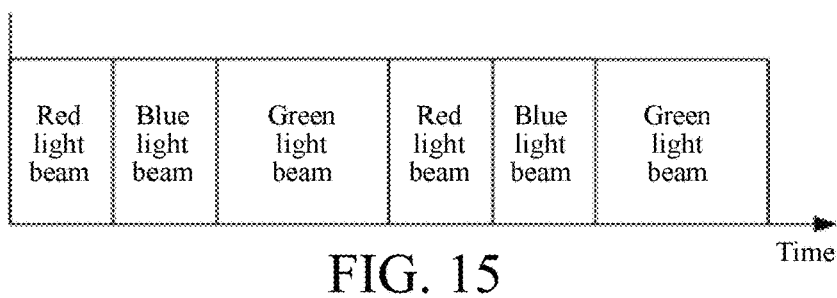
FIG. 15 schematically shows light emitting time of light beams of various colors according to one exemplary embodiment of the present disclosure.

FIG. 13 schematically shows the structure of a light source for a projection display according to one exemplary embodiment of the present disclosure. FIG. 14 schematically shows the structure of a phosphor wheel according to one exemplary embodiment of the present disclosure. FIG. 15 schematically shows light emitting time of light beams of various colors according to one exemplary embodiment of the present disclosure.

As shown in FIG. 13, the light source for the projection display in this embodiment at least includes a first laser light source 201, a third laser light source 203, a beam combining lens 204, and a phosphor wheel 205 coated with phosphor powders.

The first laser light source 201 is configured to output a first light beam within a first period of time such that the first light beam is reflected by the beam combining lens 204 at an angle of 90 degrees;

The third laser light source is configured to output a third light beam such that the third light beam is projected from a rear side of the phosphor wheel 205 onto the phosphor wheel 205.

The phosphor wheel 205 is configured to transmit the third light beam therethrough within a second period of time such that the transmitted third light beam is projected onto the beam combining lens 205, and to be excited by the third light beam within a third period of time to output a fourth light beam such that the fourth light beam is projected onto the beam combining lens 204.

The beam combining lens 204 is configured to reflect the first light beam, and to transmit the third light beam and the fourth light beam therethrough. When the first light beam is reflected by the beam combining lens 204, the transmitted third light beam and the transmitted fourth light beam are combined with the first light beam reflected by the beam combining lens 204 to form a white light beam.

In certain exemplary embodiments, the first light beam is a red light beam, the third light beam is a blue light beam, and the fourth light beam is a green light beam.

As shown in FIG. 14, in one exemplary embodiment of the present disclosure, a substrate of the phosphor wheel 205 is made of a transparent material. A front side of the phosphor wheel 205 includes: a first designated area 141, a second designated area 142, and a third designated area 143. A shading material is coated on the first designated area 141 of the front side of the phosphor wheel 205. The second designated area 142 of the front side of the phosphor wheel 205 is an uncoated area, and is in a transparent state. Phosphor powders are coated on the third designated area 143 of the front side of the phosphor wheel 205. When the light source for the projection display is in an operating state, the phosphor wheel 205 rotates at a predetermined rotation speed.

When the light source for projection display is in an operating state, the phosphor wheel 205 rotates. Therefore, when the third light beam output by the third laser light source 203 is projected onto the first designated area 141 of the phosphor wheel 205 (i.e., within the first period of time), the third light beam cannot be transmitted from the rear side of the phosphor wheel 205 therethrough to be projected onto the beam combining lens 204, and the phosphor wheel 205 does not output the fourth light beam. When the third light beam output by the third laser light source 203 is projected onto the second designated area 142 of the phosphor wheel 205 (i.e., within the second period of time), the third light beam is transmitted from the rear side of the phosphor wheel 205 therethrough to be projected onto the beam combining lens 204. When the third light beam output by the third laser light source 203 is projected onto the third designated area 143 of the phosphor wheel 205 (i.e., within the third period of time), the phosphor powders of the phosphor wheel 205 outputs the fourth light beam by excitation according to the received third light beam, and the fourth light beam is emitted rightwards along a horizontal direction to be projected onto the beam combining lens 204.

Referring to FIG. 15, and in combination with FIGS. 13 and 14, within the first period of time, the first laser light source 201 outputs the first light beam (i.e., the red light beam), and the first light beam is reflected by the beam combining lens 204 at an angle of 90 degrees to eject rightwards along a horizontal direction. Within the second period of time, the phosphor wheel 205 transmits the third light beam (i.e., the blue light beam) therethrough, and the third light beam is transmitted through the beam combining lens 204 to eject rightwards along a horizontal direction. Within the third period of time, the phosphor wheel 205 outputs the fourth light beam (i.e., the green light beam), and the fourth light beam is transmitted through the beam combining lens 204 to eject rightwards along a horizontal direction. Therefore, the light beam being output is a white light beam combined from the three light beams, i.e., the red, green, and blue light beams being output in alternation.

Further, in one exemplary embodiment of the present disclosure, instead of coating the shading materials on the first designated area 141, phosphor powders may also be coated on the first designated area 141 of the front side of the phosphor wheel 205. In this case, phosphor powders are coated on both the first designated area 141 and the third designated area 143 of the front side of the phosphor wheel 205. Only the second designated area 142 of the front side of the phosphor wheel 205 is an uncoated area, and is in a transparent state. In this case, within the first period of time, the third laser light source 203 is activated in a certain part of time within the first period of time so as to output the third light beam, and in the remaining part of time within the first period of time, the third laser light source 203 does not output the third light beam. Therefore, when the third light beam output by the third laser light source 203 is projected onto the first designated area 141 and the third designated area 143 of the phosphor wheel 205 (i.e., in the certain part of time within the first period of time, and in the third period of time), phosphor powders of the phosphor wheel 205 is excited according to the received third light beam to output the fourth light beam, such that the fourth light beam ejects rightwards along a horizontal direction to be projected onto the beam combining lens 204.

Therefore, in certain exemplary embodiments of the present disclosure, the phosphor wheel is further configured to output the fourth light beam by excitation according to the received third light beam in the first period of time, such that the fourth light beam is projected onto the beam combining lens.

In certain exemplary embodiments, within the first period of time, the first laser light source 201 outputs the first light beam, and the third laser light source 203 outputs the third light beam in the certain part of time within the first period of time. Therefore, the first light beam and the fourth light beam are output in the certain part of time within the first period of time, such that brightness may be further enhanced, and circuit control operation may become simplified.

certain exemplary embodiments of the present disclosure provide a light source for a projection display. In certain exemplary embodiments, the two light emitting manners of a laser light source emitting light and phosphor excitation emitting light are combined, and a light beam output by the phosphor powders by excitation replaces a green light beam output by a green laser, thereby creating a new light source for the projection display. In the light source for the projection display, the characteristics of small etendue of the laser light source is being utilized, such that beam combination is only performed once on the light beams output by the laser light sources of two primary colors and the light beam output by the excited phosphor powders, thereby obtaining a desired output of the white light beam by using only one beam combining lens. Therefore, the conventional beam combination structures may be simplified, the optical path of the entire light source for projection display may be shortened, and the use of complementary field lenses may be reduced, thereby effectively reducing the overall volume and the manufacturing cost of the light source for the projection display. Meanwhile, the light source for the projection display as provided in certain embodiments of the present disclosure further has advantages of having good quality, small etendue, high brightness, and the like.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. Although not explicitly described in the present disclosure, other embodiments within the scope of the disclosure and defined by the claims may be obtained by combining, modifying or changing the exemplary embodiments as described in the present disclosure.

The exemplary embodiments were chosen and described in order to explain the principles of the disclosure and their practical application so as to activate others skilled in the art to utilize the disclosure and various exemplary embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A light source for a projection display, comprising:
   a red laser light source;
   a first blue laser light source;
   a second blue laser light source;
   a beam combiner comprising a front side and a rear side opposite to the front side, wherein the beam combiner has a coating at each of the front side and the rear side thereof; and
   a phosphor wheel coated with phosphor powders;
   the red laser light source is configured to output a red light beam toward the rear side of the beam combiner, such that the red light beam is reflected by the beam combiner at an angle of 90 degrees, wherein the red laser light source is directly facing the rear side of the beam combiner;
   the first blue laser light source is configured to output a first blue light beam toward the rear side of the beam combiner, such that the first blue light beam is reflected by the beam combiner at an angle of 90 degrees, wherein the first blue laser light source is directly facing the rear side of the beam combiner;

the second blue laser light source is configured to output a second blue light beam toward the front side of the beam combiner, such that the second blue light beam is projected onto the phosphor powders of the phosphor wheel;

the phosphor wheel is configured to be excited by the second blue light beam to output a green light beam such that the green light beam is projected onto the beam combiner; and the red light beam outputted by the red laser light source and the first blue light beam outputted by the first blue laser light source are both projected toward the same rear side of the beam combiner, such that the beam combiner is configured to reflect the red light beam and the first blue light beam by the same rear side, and to transmit the green light beam therethrough, such that when the red light beam and the first blue light beam are respectively reflected by the same rear side of the beam combiner, the transmitted green light beam is combined with the reflected red light beam and the reflected first blue light beam to form a white light beam, wherein reflectivity of the combination of the coating at the front side and the rear side of the beam combiner for visible light beams having wavelengths between 500 nm and 610 nm is between 0 and 5%, and reflectivity of the combination of the coating at the front side and the rear side of the beam combiner for visible light beams having wavelengths less than 500 nm or wavelengths greater than 610 nm is between 95% and 100%.

2. The light source according to claim 1, wherein one or more of the red laser light source, the first blue laser light source, and the second blue laser light source is provided with a collimating lens, configured to collimate the corresponding light beam output by the corresponding laser light source.

3. The light source according to claim 1, further comprising:

at least one focusing lens provided between the beam combiner and the phosphor wheel, wherein the second blue light beam is focused by the at least one focusing lens to be projected onto the phosphor wheel, and the green light beam output by the phosphor wheel by excitation passes through the at least one focusing lens to be projected onto the beam combiner.

4. The light source according to claim 1, wherein the coating at the front side of the beam combiner and the coating at the rear side of the beam combiner are configured to reflect the red light beam, the first blue light beam and the second blue light beam, and to transmit the green light beam therethrough.

5. The light source according to claim 1, wherein the second blue light beam output by the second blue laser light source is reflected by the beam combiner onto the phosphor powders of the phosphor wheel at an angle of 90 degrees; and the beam combiner is further configured to reflect the second blue light beam.

6. The light source according to claim 5, further comprising:

a first focusing lens group provided between the beam combiner and the phosphor wheel, wherein the first focusing lens group comprises at least one focusing lens; wherein the second blue light beam reflected by the beam combiner passes through the at least one focusing lens of the first focusing lens group to be projected onto the phosphor powders of the phosphor wheel; and the green light beam output by the phosphor wheel by excitation passes through the at least one focusing lens of the first focusing lens group to be projected onto the beam combiner.

7. The light source according to claim 1, wherein each of the first blue laser light source outputting the first blue light beam and the second blue laser light source outputting the second blue light beam comprises at least one blue laser.

8. The light source according to claim 7, wherein the blue laser further comprises a first component for eliminating speckles.

9. The light source according to claim 7, wherein the blue laser further comprises a beam diffusion component configured to make an etendue of the blue light beam being output to be equal to the etendue of the green light beam generated by the phosphor powders.

10. The light source according to claim 1, wherein the red laser light source outputting the red light beam comprises at least one red laser.

11. The light source according to claim 1, wherein when the second blue laser light source comprises a plurality of lasers, the second blue laser light source further comprises an echelon lens; and the echelon lens comprises a plurality of reflectors in an echelon arrangement, wherein each of the reflectors corresponds to one of the lasers, and is configured to reflect light beams output by the corresponding laser to the beam combiner.

12. The light source according to claim 1, wherein a substrate of the phosphor wheel is made of a transparent material, such that the second blue light beam output by the second blue laser light source is transmitted from a rear side of the phosphor wheel onto the phosphor powders of the phosphor wheel to excite the phosphor powders of the phosphor wheel to output the green light beam.

13. The light source according to claim 1, wherein the red laser light source and the first blue laser light source are packaged on a same substrate;

the red laser light source comprises a plurality of first chips arranged on the substrate and capable of outputting the red light beam; and the first blue laser light source comprises a plurality of second chips arranged on the substrate and capable of outputting the first blue light beam.

14. The light source according to claim 1, wherein a sum of an etendue of the red light beam and an etendue of the first blue light beam is equal to an etendue of the green light beam.

15. The light source according to claim 1, wherein the phosphor powders comprise first phosphor powders that emit green light beams and second phosphor powders that emit yellow light beams.

16. The light source according to claim 15, wherein the first phosphor powders that emit the green light beams and the second phosphor powders that emit the yellow light beams are coated in a range of all 360 degrees on the phosphor wheel.

17. The light source according to claim 15, wherein the first phosphor powders that emit green light beams are coated in one range of 180 degrees on the phosphor wheel, and the second phosphor powders that emit the yellow light beams are coated in the other range of 180 degrees on the phosphor wheel.

18. A projection display, comprising:

a red laser light source;

a first blue laser light source;

a second blue laser light source;

a beam combiner comprising a front side and a rear side opposite to the front side, wherein the beam combiner has a coating at each of the front side and the rear side thereof; and a phosphor wheel coated with phosphor powders;

the red laser light source is configured to output a red light beam toward the rear side of the beam combiner, such that the red light beam is reflected by the beam combiner at an angle of 90 degrees, wherein the red laser light source is directly facing the rear side of the beam combiner;

the first blue laser light source is configured to output a first blue light beam toward the rear side of the beam combiner, such that the first blue light beam is reflected by the beam combiner at an angle of 90 degrees, wherein the first blue laser light source is directly facing the rear side of the beam combiner;

the second blue laser light source is configured to output a second blue light beam toward the front side of the beam combiner, such that the second blue light beam is projected onto the phosphor powders of the phosphor wheel;

the phosphor wheel is configured to be excited by the second blue light beam to output a green light beam such that the green light beam is projected onto the beam combiner; and the red light beam outputted by the red laser light source and the first blue light beam outputted by the first blue laser light source are both projected toward the same rear side of the beam combiner, such that the beam combiner is configured to reflect the red light beam and the first blue light beam by the same rear side, and to transmit the green light beam therethrough, such that when the red light beam and the first blue light beam are respectively reflected by the same rear side of the beam combiner, the transmitted green light beam is combined with the reflected red light beam and the reflected first blue light beam to form a white light beam.

19. The projection display according to claim 18, wherein reflectivity of the combination of the coating at the front side and the rear side of the beam combiner for the green light beams is between 0 and 5%, and reflectivity of the combination of the coating at the front side and the rear side of the beam combiner for blue light comprising the first blue light beam and the second blue light beam is between 95% and 100%.

20. The projection display according to claim 19, wherein a wavelength of the blue light is between 430 nm and 460 nm.

* * * * *